(12) United States Patent
Liu et al.

(10) Patent No.: US 10,839,841 B2
(45) Date of Patent: Nov. 17, 2020

(54) MINIMIZATION OF THERMAL MAGNETORESISTIVE OFFSET CHANGE

(71) Applicant: Seagate Technology LLC, Cupertino, CA (US)

(72) Inventors: Xiong Liu, Singapore (SG); Lihong Zhang, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/173,601

(22) Filed: Oct. 29, 2018

(65) Prior Publication Data

US 2020/0135232 A1    Apr. 30, 2020

(51) Int. Cl.
| | |
|---|---|
| *G11B 33/14* | (2006.01) |
| *G11B 5/596* | (2006.01) |
| *G11B 5/55* | (2006.01) |
| *G11B 33/02* | (2006.01) |
| *G11B 5/48* | (2006.01) |
| *G11B 33/12* | (2006.01) |

(52) U.S. Cl.
CPC ........ *G11B 5/59627* (2013.01); *G11B 5/4833* (2013.01); *G11B 5/5565* (2013.01); *G11B 5/59683* (2013.01); *G11B 33/027* (2013.01); *G11B 33/121* (2013.01); *G11B 33/1406* (2013.01); *G11B 33/1433* (2013.01)

(58) Field of Classification Search
CPC .................... G11B 33/1406; G11B 33/1433
See application file for complete search history.

(56) References Cited

U.S. PATENT DOCUMENTS

| | | | | |
|---|---|---|---|---|
| 5,808,830 | A * | 9/1998 | Stefansky | G11B 5/5526 |
| | | | | 360/137 |
| 6,342,743 | B1 * | 1/2002 | Matsuzaki | F16C 33/30 |
| | | | | 310/90 |
| 6,498,693 | B1 | 12/2002 | Au et al. | |
| 7,460,337 | B1 * | 12/2008 | Mei | G11B 5/484 |
| | | | | 360/244.3 |
| 8,699,165 | B2 | 4/2014 | Huang et al. | |
| 8,705,198 | B1 * | 4/2014 | Hebbar | G11B 5/5565 |
| | | | | 360/76 |

(Continued)

*Primary Examiner* — Jefferson A Evans

(74) *Attorney, Agent, or Firm* — Faegre Drinker Biddle & Reath LLP

(57) ABSTRACT

Provided herein is an apparatus including a disk drive base, wherein the disk drive base includes a first metal composition with a first CTE ("coefficient of thermal expansion"). A disk drive cover is attached to the disk drive base, wherein the disk drive cover includes a second metal composition with a second CTE that are different from the first metal composition and the first CTE. An arm is connected to a reader and a writer, wherein the arm is coupled to the disk drive base, the reader and the writer are separated by a distance, and the distance affects an MR ("magnetoresistive") offset. In response to temperature changes between 0° C. and 60° C., the first material and the second material expand and contract comparably and proportionally. In further response to the temperature changes between 0° C. and 60° C., a change in the MR offset is less than 10% or a preferably defined range of a track pitch on a recording medium attached to the disk drive base.

20 Claims, 2 Drawing Sheets

(56) References Cited

U.S. PATENT DOCUMENTS

| | | | | |
|---|---|---|---|---|
| 8,873,196 | B2* | 10/2014 | Masumi | B22D 19/04 |
| | | | | 360/98.07 |
| 9,159,369 | B1* | 10/2015 | Liu | G11B 27/36 |
| 9,520,149 | B1* | 12/2016 | Ding | G11B 5/59627 |
| 2002/0057521 | A1* | 5/2002 | Imaino | G11B 5/5521 |
| | | | | 360/99.18 |
| 2008/0002299 | A1* | 1/2008 | Thurn | G11B 5/4826 |
| | | | | 360/234.6 |
| 2008/0013217 | A1* | 1/2008 | Lee | G11B 5/4813 |
| | | | | 360/264.1 |
| 2008/0112299 | A1* | 5/2008 | Shimizu | G11B 33/1433 |
| | | | | 369/75.11 |
| 2009/0195919 | A1* | 8/2009 | Mahadev | G11B 5/4833 |
| | | | | 360/86 |
| 2010/0328819 | A1* | 12/2010 | Shinji | G11B 19/2009 |
| | | | | 360/244 |
| 2012/0002314 | A1* | 1/2012 | Huang | G11B 5/5565 |
| | | | | 360/31 |
| 2012/0044593 | A1* | 2/2012 | Xiao | G11B 20/20 |
| | | | | 360/31 |
| 2014/0185160 | A1* | 7/2014 | Smirnov | H02K 5/1675 |
| | | | | 360/75 |
| 2014/0300989 | A1* | 10/2014 | Smyth | G11B 21/22 |
| | | | | 360/75 |
| 2015/0116865 | A1* | 4/2015 | Mizuno | G11B 17/02 |
| | | | | 360/99.08 |
| 2019/0147917 | A1* | 5/2019 | Yap | G11B 23/0326 |
| | | | | 312/223.2 |

* cited by examiner

US 10,839,841 B2

MINIMIZATION OF THERMAL MAGNETORESISTIVE OFFSET CHANGE

SUMMARY

Provided herein is an apparatus including a disk drive base, wherein the disk drive base includes a first metal composition with a first CTE ("coefficient of thermal expansion"). A disk drive cover is attached to the disk drive base, wherein the disk drive cover includes a second metal composition with a second CTE that are different from the first metal composition and the first CTE. An arm is connected to a reader and a writer, wherein the arm is coupled to the disk drive base, the reader and the writer are separated by a distance, and the distance affects an MR ("magnetoresistive") offset. In response to temperature changes between 0° C. and 60° C., the first material and the second material expand and contract as comparably as possible. In further response to the temperature changes between 0° C. and 60° C., a change in the MR offset is less than 10% or other defined range of a track pitch on a recording medium attached to the disk drive base. These and other features and advantages will be apparent from a reading of the following detailed description.

DESCRIPTION

Figure 1:
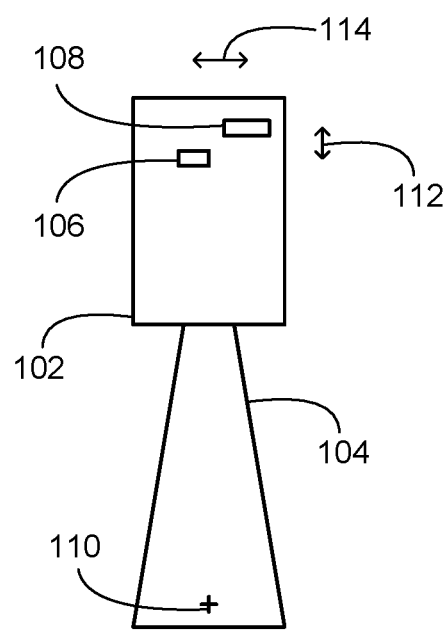
FIG. 1 shows a figurative representation of a disk drive arm and head according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Disk drives store data on one or more rotating disks. In some disk drives one or more MR heads read and write data to one or more disks. MR heads use separate reading and writing elements that are positioned a small distance apart on the MR head. As such, the write element ("writer") generates magnetic fields that write information to the rotating disk. On the other hand, the read element ("reader") reads information by detecting magnetic fields that are present on the rotating disk.

As previously stated, the reader and the writer are separate elements. The separation between the reader and the writer contributes to an MR offset value. The MR offset value describes a condition where the reader and the writer fly over different portions (e.g. tracks) of the disk, as a result of the separation between the reader and the writer. In addition, the distance between the actuator pivot of the drive arm and the MR head, the distance between the actuator pivot of the drive arm and the spindle center, and the distance between the spindle center and the MR head all contribute to the MR offset value.

During drive operation, it is important for the MR offset value to remain constant. However as temperatures fluctuate within the drive, the MR offset may change, thereby leading to problems (e.g. adjacent track erasure, etc.). One cause of the MR offset change is different drive components with different coefficients of thermal expansion. Mismatch of coefficients of thermal expansion between various drive components leads to expansion and contraction at non-uniform rates and in non-uniform amounts. Therefore, embodiments described are directed towards reducing and/or eliminating changes in the MR offset by increasing the uniformity of the coefficients of thermal expansion between the various drive components.

Referring now to FIG. 1, a figurative representation of a disk drive arm and head are shown according to one aspect of the present embodiments. The drive head slider 102 flies over a spinning disk (not shown) and is positioned at the end of a drive arm 104. The drive head slider 102 includes a reader 106 and a writer 108. The drive arm 104 rotates about a pivot 110 in order to position the reader 106 and the writer 108 over tracks (not shown) on the disk.

The reader 106 and the writer 108 include a reader-writer separation 112 and a reader-writer offset 114. As a result of the distance between the reader 106 and the writer 108, the head is skewed with respect to the tracks on the disk as the drive arm 104 rotates about the pivot 110. This results in a lateral offset between the center of the reader 106 and the center of the writer 108. However, optimum performance is achieved by centering the reader 106 over a track for read operations and centering the writer 108 over the track for write operations. Therefore, the drive arm 104 rotates about the pivot 110 in order to reposition the drive head slider 102 for read operations and write operations. As a result, the reader 106 will be off-track during write operations and the writer 108 will be off track during read operations.

Figure 2:
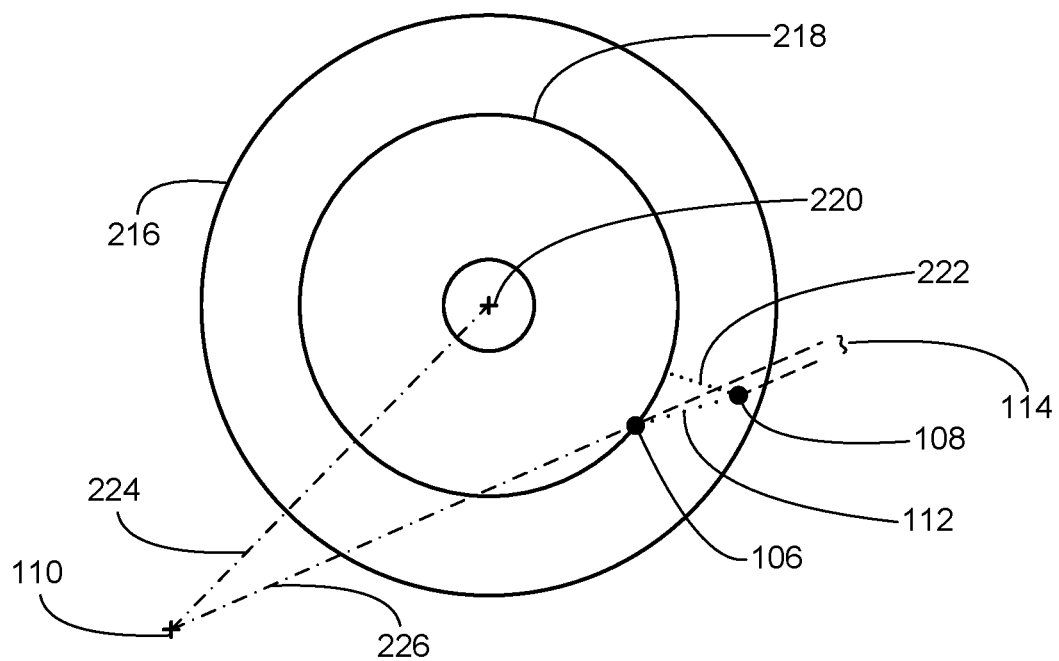
FIG. 2 shows a figurative representation of a drive media with a track according to one aspect of the present embodiments.

Referring now to FIG. 2, a figurative representation of a drive media 216 with a track 218 is shown according to one aspect of the present embodiments. During operation the drive media 216 (e.g. disk) spins about a spindle center 220. As previously discussed, the reader 106 and the writer 108 are positioned over the track 218 (as well as numerous other tracks, not shown) by the drive arm (not shown) moving about the pivot 110.

FIG. 2 illustrates that, as a result of the distance between the reader 106 and the writer 108, only one of the reader 106 or the writer 108 can be centered over the track 218 at a time. For example, FIG. 2 shows that the reader 106 is centered over the track 218 for a read operation and the writer 108 is positioned off-track. It is understood, that during a write operation, the writer 108 would be centered over the track 218 for a write operation, and the reader 106 would be positioned off-track.

In order to properly move and center the writer 108 over the track 218, it is important for dimensions within the disk drive to be known and predictable. If a dimension changes and is unknown, the disk drive may put the writer 108 in improper positions with respect to the track 218. For example, if a pivot-spindle center distance 224, a pivot-r/w distance 226 and radius of the track 218 on the disk change, the writer 108 may be incorrectly positioned. This will occur when the reader 106 is positioned on a target location on the disk (track), and the writer 108 is incorrectly positioned due to a change in a MR offset 222, or other changes (224, 226, and radius of the track). The writer location is calculated by "reader location+MR offset". So in general, when a hard drive writes track 12345 (for example), the reader stays on track 12345, and the writer stays on a position equating to "12345+MR offset" where the writer writes. When reading the written data, the reader will be moved to location "12345+MR offset" to read. In addition, the MR offset 222 is a function of track radius.

Temperature variation within the drive is one factor that may influence proper positioning of the reader 106 and the writer 108. For example, as the temperature changes within the disk drive, components may expand or contract, thereby changing the dimensions between various components. Such changes in dimensions influence the MR offset 222, also referred to as micro-jog or write-read separation versus track. The MR offset 222 may be influenced by changes to the reader-writer separation 112, the reader-writer offset 114, the pivot-spindle center distance 224 (e.g. the distance between the pivot 110 and the spindle center 220), and the pivot-r/w distance 226 (e.g. the distance between the pivot 110 and the reader 106/writer 108) and radius of track.

Mismatches between CTEs of various drive components can cause unknown and unpredictable changes to the MR offset 222. For example, as the operation temperature of the disk drive varies between 0° C. and 60° C., the MR offset 222 may change up to ~10% of track pitch ("TP"). If no adjustment is made to the position of the writer 108, this may lead to adjacent track erasure. For example, a track written at 0° C. will have ~10% erased if its adjacent track is written at 60° C.

CTE mismatches of various drive components are the result of different materials used in the various drive components (e.g. base, arm, suspension, cover, etc.). For example, a drive cover may include steel (CTE=11.7 e-6/° C.) and a drive base may include aluminum (CTE=21.1 e-6/° C.). Disk drive components including different materials that contribute to the CTE mismatches include the disk drive cover (see 304, FIG. 3), the disk drive base (see 302, FIG. 3), the disk drive arm (e.g. E-block arm) (see 316, FIG. 3), and the disk drive suspension (see 328, FIG. 3). The CTE mismatches result in unknown and unpredictable changes to the MR offset 222.

As such, embodiments are directed towards matching the CTEs of the various components by modifying the compositions of such components. By matching the CTEs of the various disk drive components, changes in the MR offset 222 can be reduced to less than 10% or other defined tolerance range of the pitch of the track 218 on the drive media 216 (e.g. a recording medium) between a required operational range (e.g. between 0° C. and 60° C.). Therefore, temperature influenced changes to the MR offset 222 are more manageable, predictable, and controllable, because the various drive components expand and contract proportionally or in equal or near-equal proportions and scales. Thus, by limiting the change of the MR offset 222 to less than 10% between 0° C. and 60° C., adjustments may more predictably be made to the operations of the hard drive in order to reduce the detrimental effects of unpredictable changes to the MR offset 222 (e.g. adjacent track erasure, loss of data, etc.).

In one non-limiting embodiment, the CTE of a steel cover and an Al base are matched by modifying the Al base composition to match the CTE of the steel cover. In order to reduce the CTE of the Al base to match the steel cover, the base may be modified to include aluminum-ceramic or aluminum-metal composites. Aluminum-ceramics may include ceramics such as Si, SiC, B, $B_4C$, Be, $Al_2O_3$, $SiO_2$, BN, $Si_3N_4$, AlN, $ZrO_2$, $ZrW_2O_8$, $Y_2W_3O_{12}$, and C (graphite). Aluminum-metal composites may include Al—Mo, Al—Be, Al—Ge, and Al—Mo—Ti. Ceramics may also form a component in aluminum-metal alloys for lower CTE materials, aluminum-germanium-silicon, aluminum-Si-bronze, and AlSiMgCuNi are such examples.

Aluminum-ceramic composites have CTEs varying from 6-18e-6/° C. CTEs of the final products depend mainly on the foreign element content, distribution, and morphology, but may also be affected by the process. Aluminum-metal composites generally have larger CTEs than aluminum-ceramic composites, but can reach to ~15e-6/° C., for example for aluminum-bronze. Both CTEs of aluminum-ceramic composites and aluminum-metal composites are close to the CTE of steel (11.7e-6/° C.), at the same time, they remain or improve other Al properties such as heat dissipation, low density, high strength, high hardness, etc.

Figure 3:
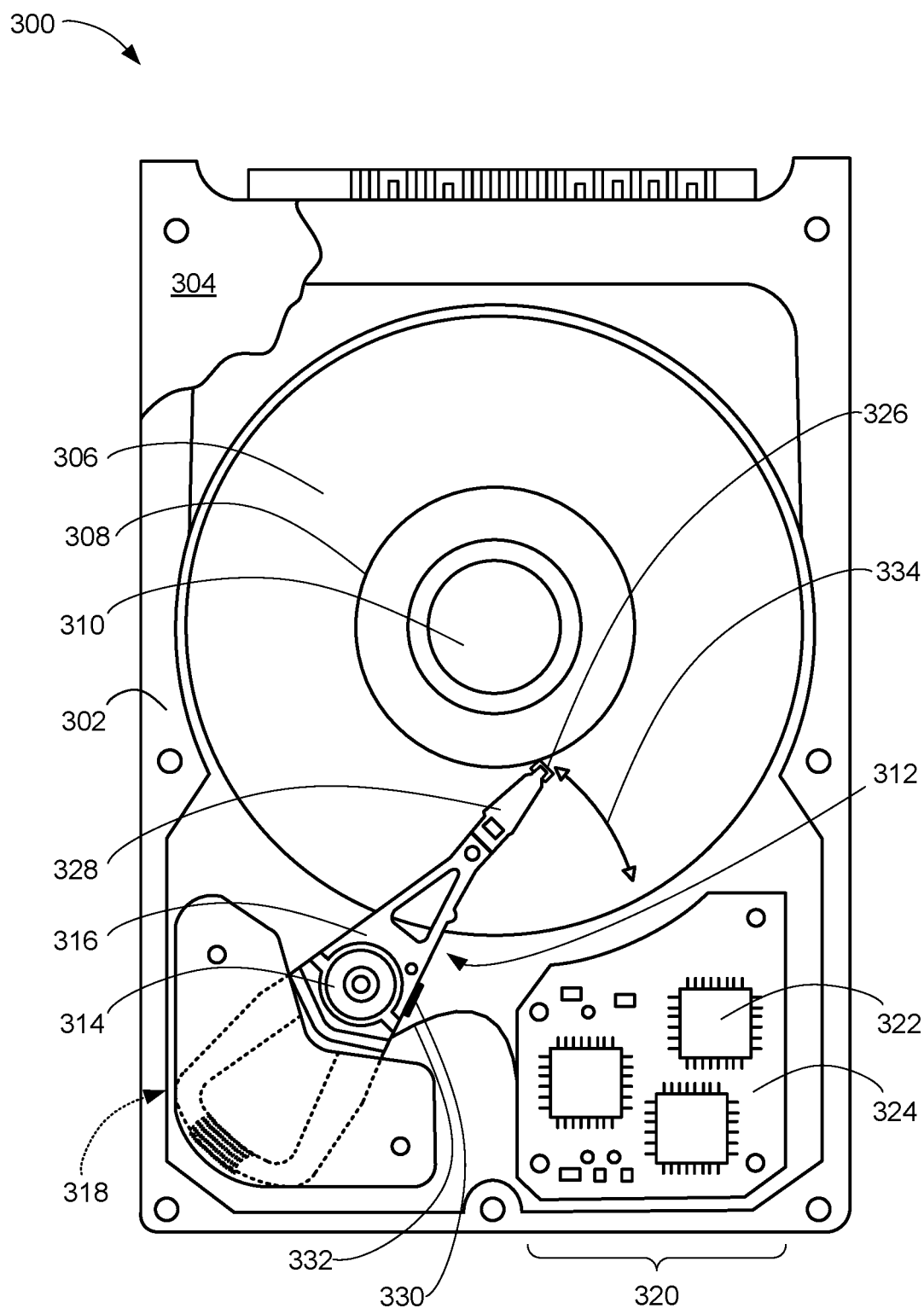
FIG. 3 shows a disk drive according to one aspect of the present embodiments.

Referring now to FIG. 3, a disk drive 300 is shown according to one aspect of the present embodiments. The disk drive 300 generally includes a base plate 302 and a cover 304 that may be disposed on the base plate 302 to define an enclosed housing for various disk drive components. The disk drive 300 includes one or more data storage disks 306 of computer-readable data storage media. Typically, both of the major surfaces of each data storage disk 306 include a plurality of concentrically disposed tracks for data storage purposes. Each data storage disk 306 is mounted on a hub 308, which in turn is rotatably interconnected with the base plate 302 and/or cover 304. Multiple data storage disks 306 are typically mounted in vertically spaced and parallel relation on the hub 308. A spindle motor 310 rotates the data storage disks 306.

The disk drive 300 also includes an actuator arm assembly 312 that pivots about a pivot bearing 314, which in turn is rotatably supported by the base plate 302 and/or cover 304. The actuator arm assembly 312 includes one or more individual rigid actuator arms 316 that extend out from near the pivot bearing 314. Multiple actuator arms 316 are typically disposed in vertically spaced relation, with one actuator arm 316 being provided for each major data storage surface of each data storage disk 306 of the disk drive 300. Other types of actuator arm assembly configurations could be utilized as well, an example being an "E" block having one or more rigid actuator arm tips, or the like, that cantilever from a common structure. Movement of the actuator arm assembly 312 is provided by an actuator arm drive assembly, such as a voice coil motor 318 or the like. The voice coil motor 318 is a magnetic assembly that controls the operation of the actuator arm assembly 312 under the direction of control electronics 320.

The control electronics 320 may include a plurality of integrated circuits 322 coupled to a printed circuit board 324. The control electronics 320 may be coupled to the voice coil motor assembly 318, a slider 326, or the spindle motor 310 using interconnects that can include pins, cables, or wires (not shown).

A load beam or suspension 328 is attached to the free end of each actuator arm 316 and cantilevers therefrom. Typically, the suspension 328 is biased generally toward its corresponding data storage disk 306 by a spring-like force. The slider 326 is disposed at or near the free end of each suspension 328. What is commonly referred to as the read/write head includes the reader 106 (see FIG. 1) and the writer 108 (see FIG. 1) appropriately mounted as a head unit (not shown) under the slider 326 and is used in disk drive read/write operations.

The head unit under the slider 326 is connected to a preamplifier 330, which is interconnected with the control electronics 320 of the disk drive 300 by a flex cable 332 that is typically mounted on the actuator arm assembly 312. Signals are exchanged between the head unit and its corresponding data storage disk 306 for disk drive read/write operations. In this regard, the voice coil motor 318 is utilized to pivot the actuator arm assembly 312 to simultaneously move the slider 326 along a path 334 and across the corresponding data storage disk 306 to position the head unit at the appropriate position on the data storage disk 306 for disk drive read/write operations.

As such, an embodiment described herein includes a disk drive base. The disk drive base includes a first metal composition with a first CTE. A disk drive cover is attached to the disk drive base. The disk drive cover includes a second metal composition that is different from the first metal composition and a second CTE that is different from the first CTE. An arm is coupled to the disk drive base and is connected to a reader and a writer. The reader and the writer are separated by a distance that affects an MR offset. In response to temperature changes between 0° C. and 60° C., the first material and the second material expand and contract proportionally or in equal or substantially equal (e.g. near-equal) proportions and scales. In further response to the temperature changes between 0° C. and 60° C., a change in the MR offset is less than 10% of a track pitch on a recording medium attached to the disk drive base.

In some embodiments the arm includes a third CTE, and the third CTE contributes to the MR offset change of less than 10% of the track pitch on the recording medium between 0° C. and 60° C. A suspension may be connected to the arm, the reader, and the writer, wherein the suspension includes a fourth CTE, and the fourth CTE contributes to the MR offset change of less than 10% of the track pitch on the recording medium between 0° C. and 60° C.

In various embodiments the first metal composition is an aluminum composition. The first metal composition may include aluminum-ceramic composites. The first metal composition may include aluminum-metal composites. The second metal composition may be a stainless steel composition.

Another embodiment described herein includes a first disk drive component with a first CTE, and a second disk drive component including a second CTE. The second disk drive component is connected to the first drive component and includes a different composition than the first disk drive component. The first disk drive component and the second disk drive component produce an adjacent track erasure of less than 10% on a recording medium between 0° C. and 60° C. In some embodiments the first disk drive component is a base or an arm. The second disk drive component may be a cover or a suspension.

In various embodiments the first drive component includes an aluminum composition. The first drive component may include silicon, oxides, carbon, carbide, nitride and boron, boride, aluminum-molybdenum, aluminum-beryllium, aluminum-germanium, aluminum-molybdenum-titanium, aluminum-germanium-silicon, aluminum-silicon-bronze, or aluminum-silicon-magnesium-copper-nickel. The second metal composition may include a stainless steel composition.

A further embodiment described herein includes a first component with a first metal composition and a first CTE. A reader and a writer are connected to the first component, wherein a separation between the reader and the writer affects an MR offset. A second component attached to the base includes a second metal composition and a second CTE that are different from the first metal composition and the first CTE. The first CTE and the second CTE limit a change of the MR offset to less than 10% between 0° C. and 60° C.

In various embodiments the first metal composition is an aluminum composition. The first metal composition may include aluminum-ceramic composites. The first metal composition may include aluminum-metal composites. The second metal composition may be a stainless steel composition.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a disk drive base, wherein the disk drive base comprises a first material with a first metal composition with a first CTE ("coefficient of thermal expansion");
   a disk drive cover attached to the disk drive base, wherein the disk drive cover includes a second material with a second metal composition with a second CTE that are different from the first metal, the first metal composition, and the first CTE; and
   an arm connected to a reader and a writer, wherein
      the arm is coupled to the disk drive base,
      the reader and the writer are separated by a distance, the distance affects an MR ("magnetoresistive") offset, and in response to temperature changes between 0° C. and 60° C., the first material and the second material expand and contract in equal or substantially equal proportions and scales, and a change in the MR offset is less than 10% of a track pitch on a recording medium.

2. The apparatus of claim 1, wherein the arm includes a third material with a third CTE, and the third CTE contributes to the change in the MR offset of less than 10% of the track pitch on the recording medium between 0° C. and 60° C.

3. The apparatus of claim 1, further comprising a suspension connected to the arm, the reader, and the writer, wherein the suspension includes a fourth material with a fourth CTE, and the fourth CTE contributes to the change in the MR offset of less than 10% of the track pitch on the recording medium between 0° C. and 60° C.

4. The apparatus of claim 1, wherein the first metal composition is an aluminum composition.

5. The apparatus of claim 1, wherein the first metal composition includes aluminum-ceramic composites.

6. The apparatus of claim 1, wherein the first metal composition includes aluminum-metal composites.

7. The apparatus of claim 1, wherein the second metal composition is a stainless steel composition.

8. An apparatus comprising:

a first disk drive component comprising a first material with a first CTE ("coefficient of thermal expansion"), the first material comprising aluminum and comprising silicon, carbon, carbide, boride, aluminum-molybdenum, aluminum-beryllium, aluminum-germanium, aluminum-molybdenum-titanium, aluminum-germanium-silicon, aluminum-silicon-bronze, aluminum-silicon-magnesium-copper-nickel, or nitride and boron; and a second disk drive component comprising a second material with a second CTE, wherein the second disk drive component is connected to the first disk drive component and includes a different composition than the first disk drive component, and the first disk drive component and the second disk drive component produce an adjacent track erasure of less than 10% on a recording medium between 0° C. and 60° C.

9. The apparatus of claim 8, wherein the first disk drive component is a base or an arm.

10. The apparatus of claim 8, wherein the second disk drive component is a cover or a suspension.

11. The apparatus of claim 8, wherein the second material comprises a stainless steel composition.

12. The apparatus of claim 8, wherein the first disk drive component is a base and the second disk drive component is a cover.

13. The apparatus of claim 12, wherein the second material comprises a stainless-steel composition.

14. The apparatus of claim 8, wherein the first disk drive component is a disk drive arm and the second disk drive component is a disk drive suspension.

15. The apparatus of claim 14, wherein the second material comprises a stainless-steel composition.

16. An apparatus comprising:

a disk drive base comprising an aluminum composition with a first CTE ("coefficient of thermal expansion");

a reader and a writer rotatable with respect to the disk drive base, wherein a separation between the reader and the writer affects an MR ("magnetoresistive") offset;

a disk drive cover attached to the disk drive base and comprising a stainless steel composition with a second CTE that is different from the first CTE, wherein, in response to temperature changes between 0° C. and 60° C., the aluminum composition and the stainless-steel composition expand and contract in equal or substantially equal proportion.

17. The apparatus of claim 16, wherein the aluminum composition comprises aluminum-ceramic composites.

18. The apparatus of claim 16, wherein the aluminum composition comprises aluminum-metal composites.

19. The apparatus of claim 16, wherein the disk drive base further comprises silicon, carbon, carbide, boride, aluminum-molybdenum, aluminum-beryllium, aluminum-germanium, aluminum-molybdenum-titanium, aluminum-germanium-silicon, aluminum-silicon-bronze, aluminum-silicon-magnesium-copper-nickel, or nitride and boron.

20. The apparatus of claim 16, wherein the first CTE and the second CTE limit a change of the MR offset to less than 10% between 0° C. and 60° C.

* * * * *